United States Patent
Ma et al.

(10) Patent No.: US 11,366,661 B2
(45) Date of Patent: Jun. 21, 2022

(54) METHOD FOR GENERATING AND PROCESSING EXTENDED INSTRUCTION AND APPARATUS USING THE METHOD

(71) Applicant: Electronics and Telecommunications Research Institute, Daejeon (KR)

(72) Inventors: Jin-Suk Ma, Daejeon (KR); Hag Young Kim, Daejeon (KR); Myeong-Hoon Oh, Daejeon (KR); Won-Ok Kwon, Sejong-si (KR); Hyuk Je Kwon, Daejeon (KR); Young Woo Kim, Daejeon (KR); Chanho Park, Sejong-si (KR); Song-woo Sok, Daejeon (KR); Byung Kwon Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/888,525

(22) Filed: May 29, 2020

(65) Prior Publication Data
US 2020/0379759 A1     Dec. 3, 2020

(30) Foreign Application Priority Data
May 31, 2019   (KR) .......................... 10-2019-0064841

(51) Int. Cl.
*G06F 9/30*     (2018.01)
*G06F 17/16*    (2006.01)
*G06F 9/54*     (2006.01)

(52) U.S. Cl.
CPC ............ *G06F 9/3001* (2013.01); *G06F 9/544* (2013.01); *G06F 17/16* (2013.01)

(58) Field of Classification Search
CPC ........ G06F 9/3001; G06F 17/16; G06F 9/544; G06F 9/30018; G06F 9/30032; G06F 9/30036; G06F 9/30181; G06F 9/30145; G06F 9/3017
See application file for complete search history.

(56) References Cited

U.S. PATENT DOCUMENTS

| | | | |
|---|---|---|---|
| 9,396,149 B2 | 7/2016 | Choi | |
| 2013/0268713 A1 | 10/2013 | Choi | |
| 2019/0042511 A1* | 2/2019 | Nachimuthu | G06F 13/4022 |
| 2019/0057063 A1* | 2/2019 | Liu | G06F 17/16 |
| 2019/0087298 A1 | 3/2019 | Kona et al. | |

OTHER PUBLICATIONS

"Gen-Z Core Specification", Version 1.0, https://keybase.pub/remexre/Specs/Gen-Z%20Core%20Specification%20version%201.0.pdf, 2018 (Year: 2018).*
"Core Specification", Gen Z, Version 1.0a, 2018, pp. 1-1014, Gen-Z Consortium.

* cited by examiner

*Primary Examiner* — Farley Abad
(74) *Attorney, Agent, or Firm* — William Park & Associates Ltd.

(57) ABSTRACT

A method for generating and processing extended instructions and an apparatus using the method are provided. The method includes: transmitting, by a first device, a request packet according to an extended instruction that is generated based on a Gen-Z interface standard to a second device; and receiving, by the first device, a response packet including a result of performing the request packet from the second device. The extended instruction is generated based on a vendor-defined instruction set of the Gen-Z interface.

11 Claims, 4 Drawing Sheets

<P2P-Core Sub-Op 1 Vendor-defined Request Opcodes>

| OpCode Name | OpCode Encoding | ID | MO | ND | Description |
|---|---|---|---|---|---|
| Mul | 0x60 | N | 0 | N | Request multiplication at two locations of a memory |
| Div | 0x61 | N | 0 | N | Request division at two locations of a memory |
| Shift Right | 0x62 | N | 0 | N | Request a right shift |
| Shift Left | 0x63 | N | 0 | N | Request a left shift |
| NOT | 0x64 | N | 0 | N | Request toggle of all bits |
| Matrix Mul | 0x65 | N | 0 | N | Request matrix multiplication |
| Matrix Sum | 0x66 | N | 0 | N | Request matrix summation |
| Matrix Transpose | 0x67 | N | 0 | N | Request matrix transpose |
| Matrix Inverse | 0x68 | N | 0 | N | Request matrix inverse |
| Matrix Add | 0x69 | N | 0 | N | Request matrix addition |
| Matrix Sub | 0x6A | N | 0 | N | Request matrix subtraction |

FIG. 4

<P2P-Core Sub-Op 1 Vendor-defined Request Opcodes>

| OpCode Name | OpCode Encoding | ID | MO | ND | Description |
|---|---|---|---|---|---|
| Mul | 0x60 | N | O | N | Request multiplication at two locations of a memory |
| Div | 0x61 | N | O | N | Request division at two locations of a memory |
| Shift Right | 0x62 | N | O | N | Request a right shift |
| Shift Left | 0x63 | N | O | N | Request a left shift |
| NOT | 0x64 | N | O | N | Request toggle of all bits |
| Matrix Mul | 0x65 | N | O | N | Request matrix multiplication |
| Matrix Sum | 0x66 | N | O | N | Request matrix summation |
| Matrix Transpose | 0x67 | N | O | N | Request matrix transpose |
| Matrix Inverse | 0x68 | N | O | N | Request matrix inverse |
| Matrix Add | 0x69 | N | O | N | Request matrix addition |
| Matrix Sub | 0x6A | N | O | N | Request matrix subtraction |

METHOD FOR GENERATING AND PROCESSING EXTENDED INSTRUCTION AND APPARATUS USING THE METHOD

CROSS-REFERENCE TO RELATED APPLICATION

This application claims priority to and the benefit of Korean Patent Application No. 10-2019-0064841 filed in the Korean Intellectual Property Office on May 31, 2019, the entire contents of which are incorporated herein by reference.

BACKGROUND OF THE INVENTION

(a) Field of the Invention

The present invention relates to a method for generating an instruction, and more particularly, the present invention relates to a method for generating and processing a Gen-Z interface standard-based extended instruction and an apparatus using the method.

(b) Description of the Related Art

Recently, application software that requires a hardware environment that completely transcends existing computing environments, such as machine learning, deep learning, in-memory computing, and large-scale global environment simulators, is rapidly developing. The above-described application software is developing in the direction of maximizing operation speed by minimizing input/output of a hard disk using local and shared memory connected to a central processing unit (CPU). Since the maximum capacity of the local memory that can have the fastest data access speed by directly connecting to the CPU is already determined in the design of the computing board, it is impossible to expand the memory beyond the maximum capacity. Thus, when a local memory of any node is insufficient, the shared memory technology that can share a memory of a remote computer node using network technology and use the shared memory as its own memory is also rapidly developing. However, in the case of a technology using a shared memory through a network, there is a limitation of inevitably having an access speed depending on a network delay time.

A part of development of current memory use technology, Gen-Z interface technology, which is a technology that can share a mass memory to the computing node itself or between nodes, has been proposed. The Gen-Z interface technology has been developed to overcome the limitations of existing local and shared memory sharing technologies and to provide flexible interface technologies. Currently, more than 50 companies such as HP, IBM, Dell EMC, Samsung, and SK Hynix are collaborating to develop the Gen-Z interface, which is the next-generation memory technology.

The Gen-Z interface is a next-generation memory control technology that presents a large memory-centric computing function in a standard methodology and implements it through an industry standardization process. However, despite the development of these technologies, complex instructions for operations such as linear algebra and matrix operations, which are essential for large-scale operations currently used in machine learning, are not supported.

Related prior literature includes "TRACE DATA" described in US Application Publication No. 2019-0087298.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method for generating and processing a Gen-Z interface standard-based extended instruction and an apparatus using the method.

In addition, the present invention has been made in an effort to provide a method and an apparatus using the same, which can add necessary instructions when calculating large-scale data while complying with standards using a manufacturer-defined instruction set of the Gen-Z interface.

An exemplary embodiment of the present invention provides a method for processing an extended instruction. The method includes: transmitting, by a first device, a request packet according to an extended instruction that is generated based on a Gen-Z interface standard to a second device; and receiving, by the first device, a response packet including a result of performing the request packet from the second device, wherein the extended instruction is generated based on a vendor-defined instruction set of the Gen-Z interface.

In an implementation, the extended instruction may include at least one of a first instruction for requesting multiplication at two locations of a memory, a second instruction for requesting division at two locations of a memory, a third instruction for requesting a right shift, a fourth instruction for requesting a left shift, a fifth instruction for requesting toggle of all bits, a sixth instruction for requesting matrix multiplication, a seventh instruction for requesting matrix summation, an eighth instruction for requesting matrix transpose, a ninth instruction for requesting matrix inverse, a tenth instruction for requesting matrix addition with a single scalar value at each element, and an eleventh instruction for requesting matrix subtraction.

In an implementation, the extended instruction may use instruction encodings from 0x60 to 0x6A.

In an implementation, the extended instruction may include all of the first to eleventh instructions, and the first to eleventh instructions each use one of the instruction encodings 0x60 to 0x6A in order.

In an implementation, the first device may be a central processing unit (CPU) and the second device may be a Gen-Z memory.

In an implementation, the second device may include a plurality of Gen-Z memories.

In an implementation, the first device may be a CPU and the second device may be a device having an operation function.

In an implementation, the second device may be a graphics processing unit (GPU) or a field programmable gate array (FPGA) accelerator.

Another exemplary embodiment of the present invention provides a processing apparatus. The apparatus includes: a first device; and a second device, wherein the first device is configured to transmit a request packet according to an extended instruction that is generated based on a Gen-Z interface standard to a second device, and the second device is configured to perform the request packet and transmit a response packet including a result of the performing, and wherein the extended instruction is generated based on a vendor-defined instruction set of the Gen-Z interface.

In an implementation, the extended instruction may include at least one of a first instruction for requesting multiplication at two locations of a memory, a second instruction for requesting division at two locations of a memory, a third instruction for requesting a right shift, a fourth instruction for requesting a left shift, a fifth instruction for requesting toggle of all bits, a sixth instruction for requesting matrix multiplication, a seventh instruction for requesting matrix summation, an eighth instruction for requesting matrix transpose, a ninth instruction for requesting matrix inverse, a tenth instruction for requesting matrix addition with a single scalar value at each element, and an eleventh instruction for requesting matrix subtraction.

In an implementation, the extended instruction may include all of the first to eleventh instructions, and the first to eleventh instructions each use one of the instruction encodings 0x60 to 0x6A in order.

In an implementation, the first device may be a CPU and the second device may be a Gen-Z memory.

In an implementation, the first device may be a CPU and the second device may be a device having an operation function.

In an implementation, the second device may include at least one of a GPU and an FPGA.

BRIEF DESCRIPTION OF THE DRAWINGS

FIG. 4 shows an extended instruction according to an exemplary embodiment of the present invention.

DETAILED DESCRIPTION OF THE EMBODIMENTS

Figure 1:
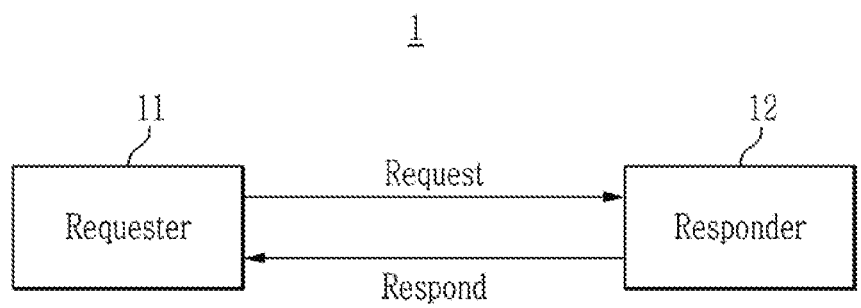
FIG. 1 shows a structure of an interface according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method for generating and processing an extended instruction and an apparatus using the method according to an exemplary embodiment of the present invention will be described.

In an exemplary embodiment of the present invention, an extended instruction based on an interface, and particularly, a Gen-Z interface standard is implemented.

The Gen-Z interface has structural features as follows.

First, byte addressing is possible.

The Gen-Z interface allows local and remote nodes to access a shared target memory, which is a volatile or nonvolatile memory device, in byte units, compared to most existing memory sharing technologies based on block-based access.

Second, it provides a standard that can be commonly used when accessing an input/output (I/O) device.

The computing components such as network cards, graphic cards, field programmable gate arrays (FPGAs), and digital signal processors (DSPs), which are widely used in existing computing components, have their respective interface standards and are attached and operated to a computing node. Using the Gen-Z interface standard, it is possible to recognize and use a device with one common software standard. That is, when the Gen-Z interface standard is applied to the above-mentioned individual computing components, uniform mutual access to individual devices is possible using Gen-Z instructions.

Third, the multi-message function of the Gen-Z interface provides a method for including multiple messaging packets within a single packet.

Forth, a method for accessing a hardware accelerator is provided.

The Gen-Z interface supports coherent and non-coherent communication methods for hardware accelerators.

The method for supporting memory semantics or memory-centric communication has been developed when implementing a Gen-Z interface having such a structural characteristic and performing an operation for accessing a resource within a computing component.

The traditional memory access of the CPU is performed using a load/store instruction. The using a load/store instruction allows for computers to load and store data fastest. Also, dedicated instructions for I/O hardware other than memory resources are separately supported in the CPU. However, when I/O-dedicated instructions are used, not only does the overall bandwidth of a computing platform decrease, but also the access delay time is different due to the characteristics of I/O devices. Therefore, even if the same I/O instruction from the CPU occurs, it has a different delay time depending on the characteristics of a target I/O device and thus data of the target I/O device arrives at different times. Because of the hardware characteristics of these I/O devices, from the viewpoint of the operating system that needs to control hardware, a method for blocking a process of using resources of a computing system with a synchronization means or for using a spinlock and the like is used to increase efficiency in the use of resources in the computing system.

To effectively overcome the above-described problem, the Gen-Z interface designs and uses instructions similar to those of the above-described load/store method, and is implemented by using Gen-Z dedicated instructions when accessing a memory and I/O devices using the Gen-Z interface. It will be significant that this approach is designed and implemented in a way that standardizes memory sharing and supports it natively and structurally. Currently, Gen-Z interface version 1.0a has been completed, and the standard is provided only to companies that have joined the Gen-Z consortium.

For the instruction set of the Gen-Z interface, based on the current version 1.0a, the Gen-Z interface provides a total of 35 OpClasses, and one OpClass is composed of an instruction set composed of 32 OpCodes in detail. Therefore, the Gen-Z interface is arithmetically a component control standard composed of a thousand instructions.

Meanwhile, the 35 OpClasses are divided into implicit OpClasses and explicit OpClasses, which are classified according to whether the OpClass label field exists in the packet header used for transmitting the OpClass.

There are three implicit OpClasses in the 35 OpClasses and the other 32 are the explicit OpClasses. The implicit OpClasses are intended for use in point-to-point (P2P), mesh, and daisy-chain topologies, and the explicit OpClasses are intended for use in P2P and switch-based topologies.

The instructions of the implicit OpClasses may be used for the following purpose:

1. P2P-Core: It represents communication between memories optimized for P2P and daisy chain structures, and is mainly used for communication between a CPU and memory devices supporting the Gen-Z interface.

2. P2P-Coherency: It represents P2P communication between components that require coherent communication, and is mainly used for communication between a CPU and a graphics processing unit (GPU) that supports the Gen-Z interface, communication between system on chip (SoC) accelerators, and the like.

3. P2P-Vendor-defined: It represents vendor-defined P2P communication.

The instructions of the explicit OpClasses may be further described as follows:

1. Core 64: It is used for single and multi-subnet communication with 64-bit addresses.

2. Control: It is used for an in-band management operation, event notification, and the like.

3. Atomic1: It is used for an atomic operation.

4. Large Data Move 1: It is used for a buffering operation and a large read operation.

5. Advanced 1: It represents a pattern operation and lightweight notification function.

6. Advanced 2: It represents a precision timer and a unicast packet summary.

7. Context ID: It is used for an operation to indicate a response context identifier.

8. Multicast: It is used for an unreliability and reliability multicast operation.

9. Strong Ordered Domain (SOD): It is used for a strong ordering operation.

10. 8 Vendor Defined OpClasses: It represents a vendor-defined operation or a standard operation.

FIG. 1 shows a structure of an interface according to an exemplary embodiment of the present invention.

Specifically, the interface according to an embodiment of the present invention is a Gen-Z interface, and the Gen-Z interface has a basic instruction transfer and return structure. The Gen-Z interface 1 designs instructions based on including a requester 11 generating an instruction and a responder 12 receiving and executing an instruction packet including the instruction. The instruction generated by the requester 11 is sent to the responder 12 in the form of a request, and the responder 12 executes the instruction sent in the form of a request, and when the instruction execution is completed, the requester 11 informs whether or not the instruction has been completed in the form of a response.

Figure 2:
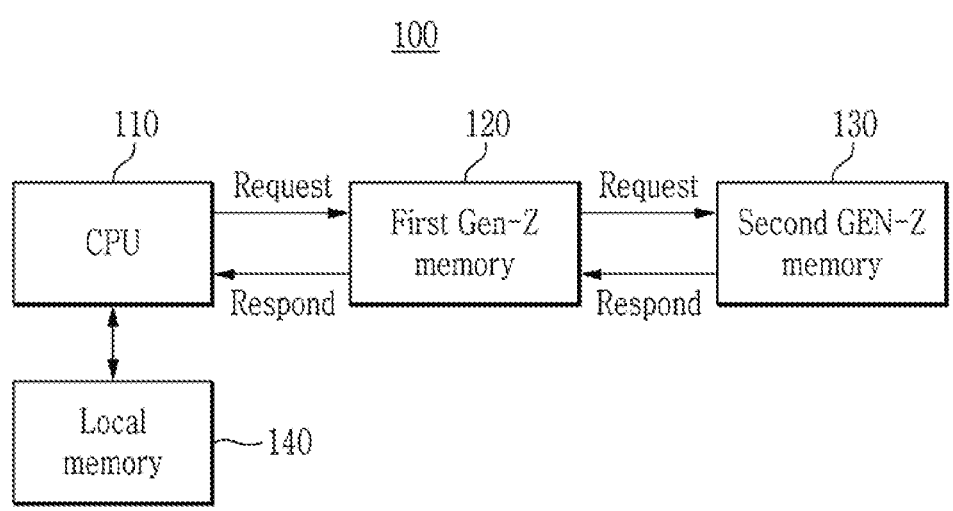
FIG. 2 shows a structure of a processing apparatus with an interface standard according to an exemplary embodiment of the present invention.

FIG. 2 shows a structure of a processing apparatus with an interface standard according to an exemplary embodiment of the present invention.

The processing apparatus 100 according to an embodiment of the present invention uses the Gen-Z interface, and includes, as illustrated in FIG. 2, a CPU 110, a plurality of Gen-Z memories 120 and 130, and a local memory 140. Here, two Gen-Z memories are exemplified, but the present invention is not limited thereto.

The CPU 110 becomes a requester, and the first Gen-Z memory 120 and the second Gen-Z memory 130 become responders. The CPU 110 is basically equipped with a local memory 140 for executing a program in a traditional computing structure. The local memory 140 is initialized at the moment when the CPU 110 starts a boot process using a boot loader, and the CPU 110 is configured to load a program on a hard disk, make the program in a process state to execute the program, and load a page table for the process. In addition, in the case of a system using a built-in graphics processor inside the CPU, the local memory 140 may be configured to store a graphics memory page table and graphics memory data of a graphics processor.

As the use of applications such as big data programs and machine learning programs that are driven while generating large amounts of data in the program itself becomes common, memory shortages occur with only existing local memory. Accordingly, there are cases in which it is difficult to quickly execute a program.

However, since the maximum capacity of the local memory 140 is predetermined when designing a main board equipped with a CPU, there is a limit to the size of the acceptable memory of the local memory 140. To solve this, the memory using the Gen-Z interface is added to the main board. Accordingly, the processing apparatus 100 includes a first Gen-Z memory 120 and a second Gen-Z memory 130 as shown in FIG. 2. The purpose of a program (or process) may be achieved while loading/storing the large amount of data generated during the run time of the program in the first Gen-Z memory 120 and the second Gen-Z memory 130.

Meanwhile, according to the Gen-Z interface standard, it is possible to directly exchange data between the first Gen-Z memory 120 and the second Gen-Z memory 130 without intervention of the CPU 110. This is defined as the P2P (Point to Point) standard, in which the instruction is designed, implemented, and used. P2P communication between the CPU 110 and the Gen-Z memories 120 and 130 is also possible. This is because the CPU 110 can also act as a requester that can generate Gen-Z instructions.

According to the Gen-Z interface standard, communication between memory devices connected by P2P can transmit and execute instructions using a P2P-Core instruction set.

It should be noted that the structure of the processing apparatus 100 shown in FIG. 2 is only an example for comprehensively indicating that the first Gen-Z memory 120 and the second Gen-Z memory 130 can be used in form of a daisy-chain connection. In actual implementation, if the desired memory capacity and the purpose of the program can be achieved only with the first Gen-Z memory 120, it will be understood that the use of the second Gen-Z memory 130 may be unnecessary.

Unlike the application combined with the CPU and the memory device described above, a device with its own computing capability, apart from the computing function of the CPU, can also be connected using the Gen-Z interface standard.

Figure 3:
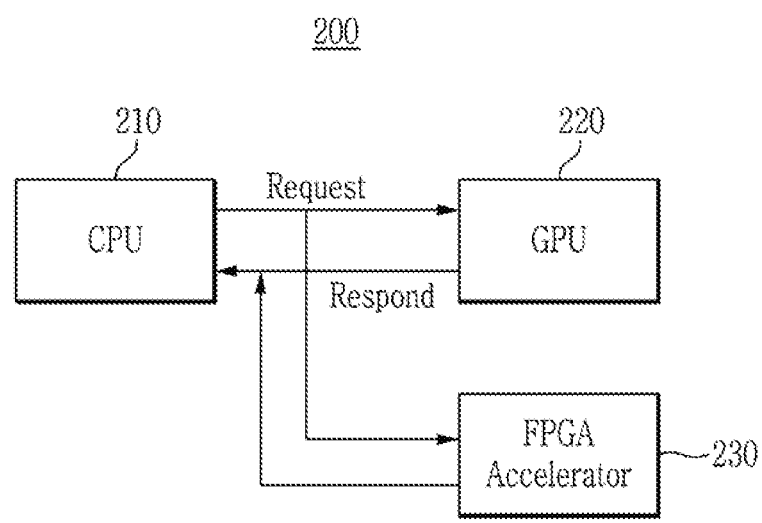
FIG. 3 shows a structure of a processing apparatus with an interface standard according to another exemplary embodiment of the present invention.

FIG. 3 shows a structure of a processing apparatus with an interface standard according to another exemplary embodiment of the present invention.

Specifically, in FIG. 3, a case in which a device having its own computing capability is connected using a Gen-Z interface is shown. The device with its own computing capability includes a graphics processing unit (GPU) that can calculate graphics data differently from a memory device storing data manually and an FPGA accelerator that implements high-speed operation required by a CPU with dedicated hardware logic and the like.

The processing apparatus 200 according to another exemplary embodiment of the present invention uses a Gen-Z interface and as shown in FIG. 3, and includes a CPU 210, a GPU 220, and an FPGA accelerator 230. The CPU 210 becomes a requester, while the GPU 220 and the FPGA accelerator 230 become a responder.

When the computing element such as the CPU 210, the GPU 220, and the FPGA accelerator 230 has a connection structure as shown in FIG. 3, mutual instruction exchange can be achieved by using a P2P-Coherency instruction according to the Gen-Z interface standard.

For example, according to the Gen-Z interface version 1.0a, respective instructions (Opcode) of the P2P-Core OpClass are shown in Table 1 below.

TABLE 1

<P2P-Core Opclass Opcodes>

| OpCode name | OpCode encoding | MO | ND | Description |
| --- | --- | --- | --- | --- |
| Write | 0x4 | M | N | Write data of a specific size to the indicated address |
| Write offset | 0x5 | MC | N | Write request - Write payload bytes at the indicated offset |
| Read 16 | 0xC | O | N | Fixed size read request - 16 bytes |
| Read 32 | 0xD | O | N | Fixed size read request - 32 bytes |
| Read 128 | 0xF | O | N | Fixed size read request - 128 bytes |
| SWrite Persistent | 0x6 | O | N | Write persistent |
| Omit below | | | | |

MO: Mandatory (M)/Optional (O)

MC: Mandatory (Conditional)

ND: Non-deterministic time to execute (Yes(Y)/No(N))

ID: Idempotent request (Yes(Y)/No(N))

The instructions of the P2P-Core OpClass shown in Table 1 above are mainly shown for instructions related to loading and storing, and are illustrated to understand Gen-Z instructions according to an embodiment of the present invention.

In addition, P2P-Core Core Sub-Op 1 request instructions presented in Gen-Z Interface Standard version 1.0a are shown in Table 2 below.

TABLE 2

<P2P-Core Sub-Op 1 Request Opcodes>

| OpCode name | OpCode encoding | ID | MO | ND | Description |
| --- | --- | --- | --- | --- | --- |
| Add | 0x0 | N | O | N | Used to request a single add operation |
| Sum | 0x1 | N | O | N | Used to request data from two memory locations to be added together |
| Swap | 0x2 | N | O | N | Used to request a single unconditional swap operation |
| Logical AND | 0x7 | N | O | N | Used to request a bitwise logical AND operation |
| Omit below | | | | | |
| Vendor-defined [0-31] | 0x60-0x7F | — | O | — | Vendor-defined Request Opcodes [0-31] |

As shown in Table 2, P2P-Core Sub-Op 1 request instructions include an arithmetic operation instruction, a bit operation instruction, and a vendor-defined instruction (Vendor-defined Opcode).

The vendor-defined instruction is an instruction that is defined and used when needed by an individual manufacturer or a standard technology implementer in implementing the Gen-Z interface, and a function that does not exist in the Gen-Z interface can be defined using the vendor-defined instruction. Therefore, the vendor-defined instruction can be understood as an instruction extension function unit having a meaning to be included and implemented in the Gen-Z interface.

Specifically, "Vendor-defined [0-31]", the instruction (OpCode) shown at the bottom of Table 2, is a vendor-defined instruction, and a total of 32 vendor-defined instructions from 0 to 31 can be added. Opcode encoding corresponding to this is defined to use a total of 32 instruction encodings from 0x60 to 0x7E.

In an exemplary embodiment of the present invention, by using a vendor-defined instruction set of the Gen-Z interface, an instruction that is necessary for large-scale data operation while conforming to the standard is added.

The Gen-Z interface currently does not support complex instructions such as linear algebra and matrix operations, which are essential for large-scale operations used in machine learning. In an embodiment of the present invention, a vendor-defined OpClass instruction defined in the Gen-Z interface is additionally implemented to compensate for a functional disadvantage that is not provided in the Gen-Z interface. In the following description, the vendor-defined OpClass instruction additionally defined in an exemplary embodiment of the present invention will be referred to as an "extended instruction".

The extended instruction according to an exemplary embodiment of the present invention is shown in FIG. 4.

FIG. 4 shows the extended instruction according to an exemplary embodiment of the present invention.

In FIG. 4, vendor-defined OpClass instructions to be used in an exemplary embodiment of the present invention, that is, extended instructions, are presented. Specifically, the extended instruction according to an exemplary embodiment of the present invention includes at least one of a Mul (which may be referred to as a first instruction and may use 0x60 instruction encoding) that is an instruction for requesting multiplication at two locations of a memory, a Div (which may be referred to as a second instruction and may use 0x61 instruction encoding) that is an instruction for requesting division at two locations of a memory, a Shift Right (which may be referred to as a third instruction and may use 0x62 instruction encoding) that is an instruction for requesting a right shift, a Shift Left (which may be referred to as a fourth instruction and may use 0x63 instruction encoding) that is an instruction for requesting a left shift, a NOT (which may be referred to as a fifth instruction and may use 0x64 instruction encoding) that is an instruction for requesting toggle of all bits, a Matrix Mul (which may be referred to as a sixth instruction and may use 0x65 instruction encoding) that is an instruction for requesting matrix multiplication, a Matrix Sum (which may be referred to as a seventh instruction and may use 0x66 instruction encoding) that is an instruction for requesting matrix summation, a Matrix Transpose (which may be referred to as an eighth instruction and may use 0x67 instruction encoding) that is an instruction for requesting matrix transpose, a Matrix Inverse (which may be referred to as a ninth instruction and may use 0x68 instruction encoding) that is an instruction for requesting matrix inverse, a Matrix Add (which may be referred to as a tenth instruction and may use 0x69 instruction encoding) that is an instruction for requesting matrix addition with a single scalar value at each element, and a Matrix Sub (which may be referred to as an eleventh instruction and may use 0x6A instruction encoding) that is an instruction for requesting matrix subtraction.

By generating such extended instructions, system bandwidth through CPU off-loading with instruction enhancement is improved.

Also, by adding the Mul and Div instructions, high-precision operation is possible without going through the CPU, and accordingly, the operation speed of the entire system can be increased. Further, a bit operation may be enhanced by Shift Right and Shift Left instructions. In addition, the bit toggle function may be enhanced by the NOT instruction, and the performance of a high-dimensional matrix operation may be enhanced due to the addition of matrix operations, and thus the operation time may be shortened.

Meanwhile, the number of the OpCode encoding shown in FIG. 4 is only one implementation example according to an embodiment of the present invention, and other OpCode encoding numbers may be used. Also, the order of the OpCode encodings is not limited to that shown in FIG. 4.

The instruction set including the extended instructions according to an embodiment of the present invention is implemented using hardware description language (HDL) or dedicated arithmetic logic unit (ALU) logic with an FPGA or dedicated chipset that implements the Gen-Z interface. Since a person skilled in the art can implement this, detailed description is omitted here.

Designed to provide a large-scale local and shared memory, the Gen-Z interface itself provides a large number of instruction sets in the standard definition, but it has significant operational instruction support to implement core algorithms in the latest software fields such as machine learning. However, according to an exemplary embodiment of the present invention, the parts that the Gen-Z interface does not support can be compensated.

The extended instruction set according to an embodiment of the present invention is a numerically small number of instructions when compared to the instructions to be supported by the existing Gen-Z interface, but is instructions that are essential in terms of the latest application software such as machine learning. It can be provided by using vendor-defined OpClass instruction implementation presented in the Gen-Z interface.

The High-speed memory operation of an application program or an application process is possible by using the extended instructions according to an embodiment of the present invention. Particularly, it is possible to improve the execution speed of machine learning, deep learning, and ultra-sized variable operation simulation programs.

A processing method in the case of applying the extended instructions to the processing apparatus according to an embodiment of the present invention is as follows.

For example, as shown in FIG. 2, in the processing apparatus 100 including the CPU 110 and at least one Gen-Z memory 120 and 130 using the Gen-Z interface, operation processing is performed based on extended instructions according to an embodiment of the present invention, which are instructions required for large-scale data operation and include at least one of the first to eleventh instructions based on the vendor-defined instruction set of the Gen-Z interface.

As a program based on an extended instruction including at least one of the first to eleventh instructions is loaded and executed from a local memory to the CPU 110, the CPU 110 performs the corresponding operation according to an arbitrary extended instruction when executing the program.

For example, when the extended instruction is the first instruction "Mul" or the second instruction "Div", the CPU 110 may send a request packet for requesting data to the first Gen-Z memory 120 in FIG. 2, perform an operation corresponding to the extended instruction based on the data included in a response packet provided from the first Gen-Z memory 120, and store the result of the operation to the first Gen-Z memory 120.

Meanwhile, direct data exchange can be performed between the first Gen-Z memory 120 and the second Gen-Z memory 130 without the intervention of the CPU 110. When there is no related data in the first Gen-Z memory 120, the first Gen-Z memory 120 may receive the related data through communication with the second Gen-Z memory 130 and transfer it to the CPU 110.

For another example, as shown in FIG. 3, in the processing apparatus 200 including the CPU 210, the GPU 220 having the computing capability, and the FPGA accelerator 230, operation processing is performed based on expanded instructions according to an embodiment of the present invention, which are instructions required for large-scale data operation and include at least one of the first to eleventh instructions based on the vendor-defined instruction set of the Gen-Z interface.

As a program based on an extended instruction including at least one of the first to eleventh instructions is loaded and executed from a local memory to the CPU 210, the CPU 210 performs the corresponding operation according to an arbitrary extended instruction when executing the program. For example, when the extended instruction is the first instruction "Mul" or the second instruction "Div", the CPU 210 may send a request packet including the extended instruction to the GPU 220 or the FPGA 230, and the GPU 220 or the FPGA 230 may perform an operation corresponding to the extended instruction. The result of the operation is included in a response packet and then is provided to the CPU 210. For "Mul" or "Div", since the high-precision operation is possible without going through the CPU, the operation speed of the entire system can be increased.

Meanwhile, in an embodiments of the present invention, the numbers or order assigned in the OPcode encoding are not limited to those described above, and can be changed.

Figure 5:
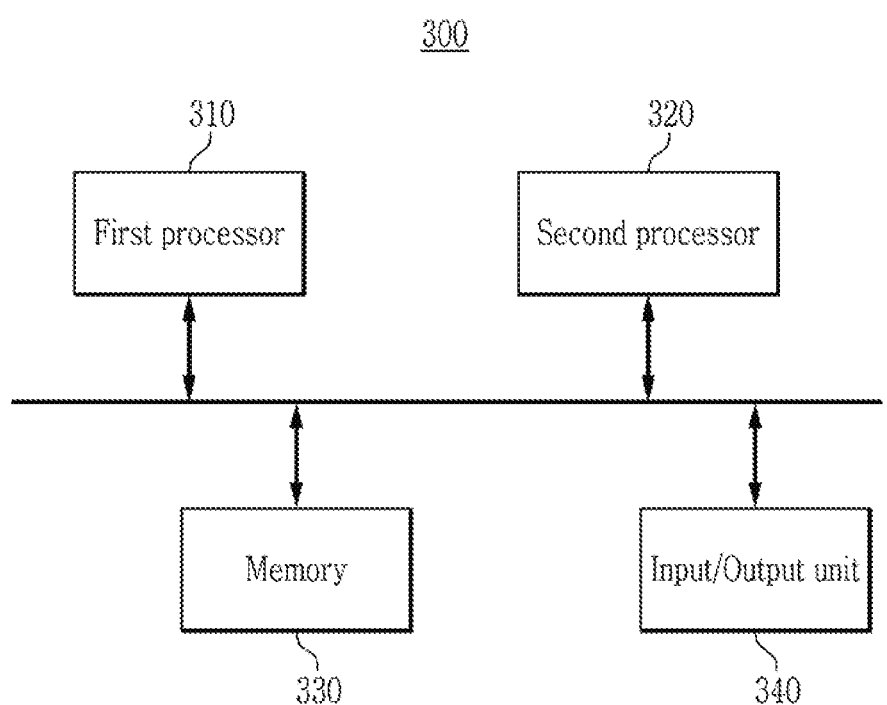
FIG. 5 shows a structure of a processing apparatus with an interface standard according to still another exemplary embodiment of the present invention.

FIG. 5 shows a structure of a processing apparatus with an interface standard according to still another exemplary embodiment of the present invention.

The processing apparatus 300 according to still another exemplary embodiment of the present invention includes, as shown in FIG. 5, at least one first processor 310, second processor 320, memory 330, and input/output unit 340 that communicate with each other via a bus.

The first processor 310 may be a CPU, and the second processor 320 may be a computing element having an operation function, such as a GPU and an FPGA accelerator.

The memory 330 may include various types of volatile and nonvolatile memories such as a memory according to the Gen-Z interface standard and a boot read-only memory (ROM).

The input/output unit 340 may be a user interface input/output device or a network interface device that can communicate with other devices through a network.

The processing apparatus having such a structure may refer to the description described in the above embodiments, and detailed description is omitted here.

The processing apparatus 300 may include a semiconductor device that executes processing instructions stored in a memory or a storage device through a CPU.

The software module including an extended instruction generated according to an embodiment of the present invention includes random access memory (RAM), flash memory, read-only memory (ROM), and erasable programmable read-only memory (erasable) programmable ROM (EPROM), electrically erasable programmable read-only memory (EPROM, EEPROM), registers, a hard disk, a mobile hard disk, a compact disk read-only memory (CD-ROM), or any other form known in the art.

According to an embodiment of the present invention, it is possible to additionally generate and provide instructions capable of compensating for a functional disadvantage while following the standard specification defined in the Gen-Z interface.

In particular, by using the vendor-defined instruction set of the Gen-Z interface, it is possible to generate and provide necessary instructions that are necessary for large-scale data operations while conforming to the standard. Accordingly, high-speed memory operations are also possible and the execution speed of machine learning, deep learning, and an ultra-large scale variable operation simulation program can be improved.

All or part of the above-described embodiments may be implemented by software, hardware, firmware, or any combination thereof. When software is used to implement the embodiments, the embodiments may be implemented in whole or in part in the form of computer program products. The computer program product includes at least one computer instruction. When computer program instructions are loaded and executed on a computer, procedures or functions according to the present invention are created in whole or in part. The processing apparatus may be a general purpose computer, a dedicated computer, a computer network, or other programmable device. Computer instructions may be stored on a computer-readable storage medium or transmitted using a computer-readable storage medium.

The components described in the exemplary embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the exemplary embodiments may be implemented by software, and the software may be recorded on a recording medium. The components, the functions, and the processes described in the exemplary embodiments may be implemented by a combination of hardware and software.

The method according to exemplary embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium), or in a propagated signal for processing by, or to control an operation of, a data processing apparatus, e.g., a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk, and a read-only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated into, a special purpose logic circuit.

The processor may run an operating system (OS) and one or more software applications that run on the OS. The processor device may also access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific exemplary embodiment. Features described in the specification in the context of individual exemplary embodiments may be implemented as a combination in a single exemplary embodiment. In contrast, various features described in the specification in the context of a single exemplary embodiment may be implemented in multiple exemplary embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described exemplary embodiments in all exemplary embodiments, and it should be understood that the above-described program components and apparatuses may be incorporated into a single software product or may be packaged in multiple software products.

It should be understood that the exemplary embodiments disclosed herein are merely illustrative and are not intended to limit the scope of the invention. It will be apparent to one of ordinary skill in the art that various modifications of the exemplary embodiments may be made without departing from the spirit and scope of the claims and their equivalents.

What is claimed is:

1. A method for processing an extended instruction, comprising:
    transmitting, by a first device, a request packet according to an extended instruction that is generated based on a Gen-Z interface standard to a second device; and
    receiving, by the first device, a response packet including a result of performing the request packet from the second device,
    wherein the extended instruction is generated based on a vendor-defined instruction set of the Gen-Z interface standard and includes a first instruction for requesting multiplication at two locations of a memory, a second instruction for requesting division at two locations of a memory, a third instruction for requesting a right shift, a fourth instruction for requesting a left shift, a fifth instruction for requesting toggle of all bits, a sixth instruction for requesting matrix multiplication, a seventh instruction for requesting matrix summation, an eighth instruction for requesting matrix transpose, a ninth instruction for requesting matrix inverse, a tenth instruction for requesting matrix addition with a single scalar value at each element, and an eleventh instruction for requesting matrix subtraction, and
    wherein the first to eleventh instructions each use one of the instruction encodings from 0x60 to 0x6A in order.

2. The method of claim 1, wherein the first device is a central processing unit (CPU) and the second device is a Gen-Z memory.

3. The method of claim 2, wherein the second device includes a plurality of Gen-Z memories.

4. The method of claim 1, wherein the first device is a CPU and the second device is a device having an operation function.

5. The method of claim 4, wherein the second device is a graphics processing unit (GPU) or a field programmable gate array (FPGA) accelerator.

6. The method of claim 1, wherein the instructions that are necessary for large-scale data operations use one of instruction encodings 0x60 to 0x6A in order.

7. A processing apparatus, comprising:
    a first device; and
    a second device,
    wherein the first device is configured to transmit a request packet according to an extended instruction that is generated based on a Gen-Z interface standard to the second device, and the second device is configured to perform the request packet and transmit a response packet including a result of the performing, and
    wherein the extended instruction is generated based on a vendor-defined instruction set of the Gen-Z interface standard and includes a first instruction for requesting multiplication at two locations of a memory, a second instruction for requesting division at two locations of a memory, a third instruction for requesting a right shift, a fourth instruction for requesting a left shift, a fifth instruction for requesting toggle of all bits, a sixth instruction for requesting matrix multiplication, a seventh instruction for requesting matrix summation, an eighth instruction for requesting matrix transpose, a ninth instruction for requesting matrix inverse, a tenth instruction for requesting matrix addition with a single scalar value at each element, and an eleventh instruction for requesting matrix subtraction, and
    wherein the first to eleventh instructions each use one of the instruction encodings 0x60 to 0x6A in order.

8. The apparatus of claim 7, wherein the first device is a CPU and the second device is a Gen-Z memory.

9. The apparatus of claim 7, wherein the first device is a CPU and the second device is a device having an operation function.

10. The apparatus of claim 9, wherein the second device includes at least one of a GPU and an FPGA.

11. The apparatus of claim 7, wherein the instructions that are necessary for large-scale data operations use one of instruction encodings 0x60 to 0x6A in order.

* * * * *